United States Patent
Ellis

(10) Patent No.: US 7,948,704 B2
(45) Date of Patent: May 24, 2011

(54) USING SERVO DATA HARMONICS TO MONITOR HEAD-MEDIUM SPACING

(75) Inventor: Timothy Francis Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 387 days.

(21) Appl. No.: 12/140,693

(22) Filed: Jun. 17, 2008

(65) Prior Publication Data

US 2009/0153996 A1 Jun. 18, 2009

Related U.S. Application Data

(60) Provisional application No. 61/014,280, filed on Dec. 17, 2007.

(51) Int. Cl.
G11B 21/02 (2006.01)

(52) U.S. Cl. ......................................... 360/75

(58) Field of Classification Search ............ 360/31, 360/75, 48; 428/848.1; 369/59.21
See application file for complete search history.

(56) References Cited

U.S. PATENT DOCUMENTS

| | | | |
|---|---|---|---|
| 5,130,866 A | 7/1992 | Klaassen et al. | |
| 6,075,666 A * | 6/2000 | Gillingham et al. | 360/48 |
| 6,084,754 A | 7/2000 | Smith et al. | 360/135 |
| 6,249,393 B1 * | 6/2001 | Billings et al. | 360/31 |
| 6,384,994 B1 | 5/2002 | Smith et al. | 360/25 |
| 6,529,460 B1 * | 3/2003 | Belser | 369/59.21 |
| 6,671,110 B2 * | 12/2003 | Baba et al. | 360/31 |
| 6,671,111 B2 | 12/2003 | Ottesen et al. | 360/31 |
| 6,950,267 B1 * | 9/2005 | Liu et al. | 360/75 |
| 7,038,875 B2 | 5/2006 | Lou et al. | |
| 7,342,736 B1 * | 3/2008 | Turner et al. | 360/75 |
| 7,468,854 B2 * | 12/2008 | Yamashita et al. | 360/75 |
| 2006/0280974 A1 * | 12/2006 | Okino et al. | 428/848.1 |
| 2007/0211368 A1 * | 9/2007 | Shibano et al. | 360/75 |

OTHER PUBLICATIONS

U.S. Appl. No. 09/872,720, filed Dec. 2002, Ottesen et al.
U.S. Appl. No. 10/034,798, filed Jul. 2003, Smith et al.
U.S. Appl. No. 10/754,392, filed Jul. 2005, Biskeborn.
U.S. Appl. No. 11/476,584, filed Oct. 2007, Yokohata et al.
U.S. Appl. No. 11/751,135, filed Nov. 2007, McFadyen et al.

* cited by examiner

Primary Examiner — Fred Tzeng
(74) Attorney, Agent, or Firm — Christopher J. Volkmann; Westman, Champlin & Kelly, P.A.

(57) ABSTRACT

A method is disclosed that includes measuring a first amplitude and a second amplitude in a servo pattern signal derived from a transducer head interacting with a medium; and providing an indication of a change in a spacing distance between the head and the medium, wherein the change in the spacing is evaluated using a spacing relation derived from a ratio of the first harmonic amplitude and the second harmonic amplitude.

22 Claims, 5 Drawing Sheets

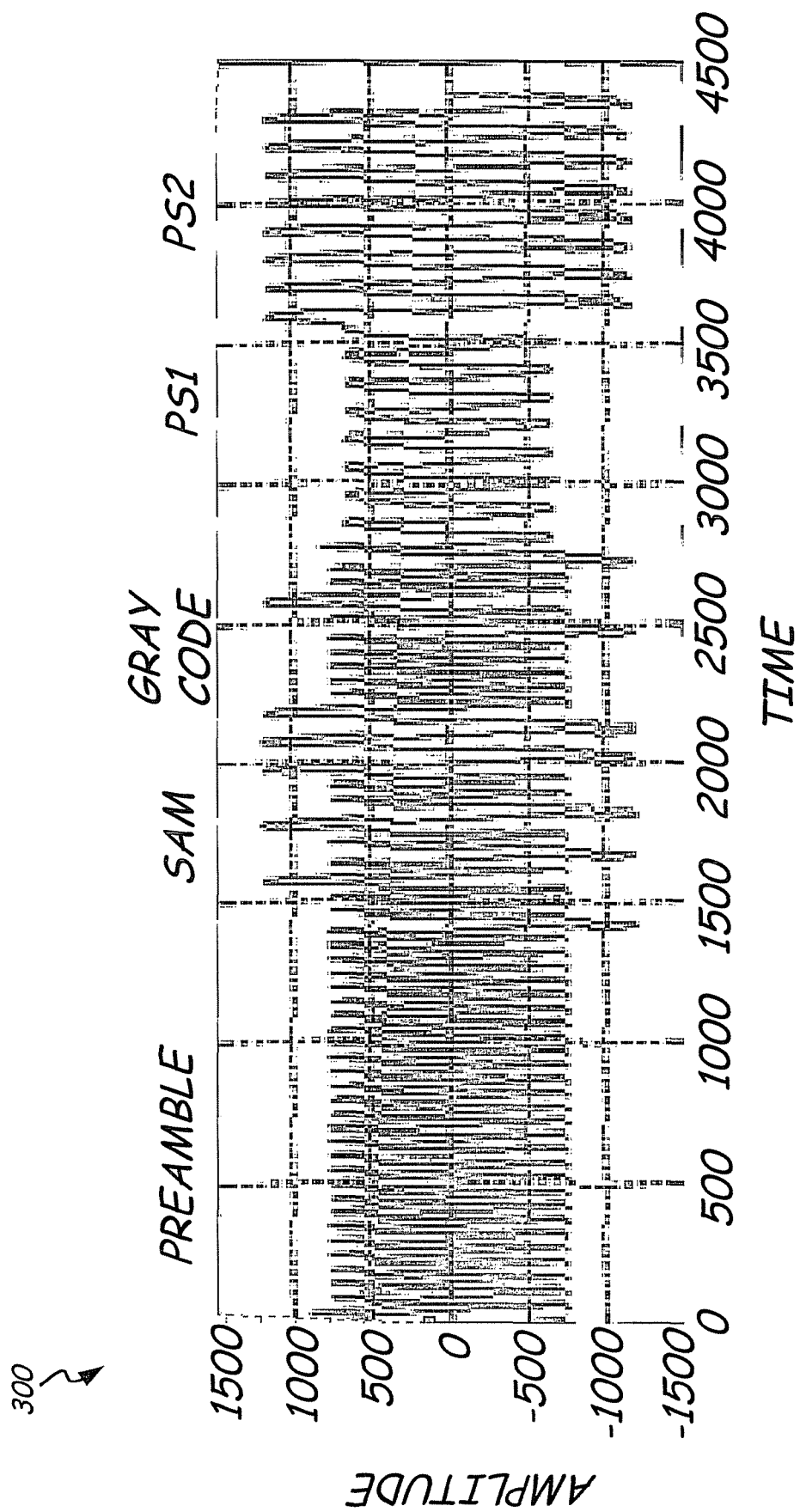
FIG. 3: HALF RATE SERVO PATTERN

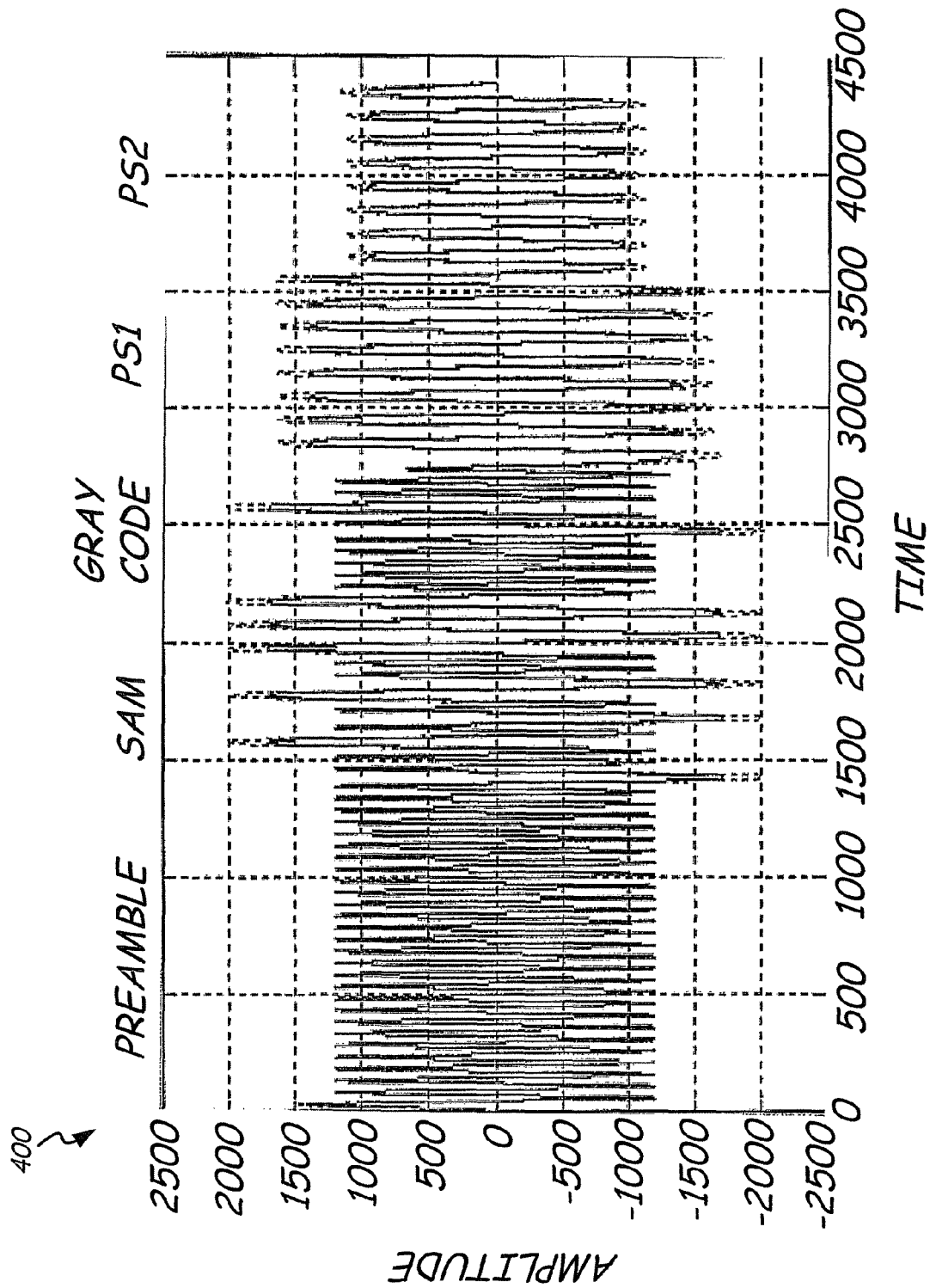
FIG. 4: READ BACK SIGNAL AT TWO SPACING VALUES

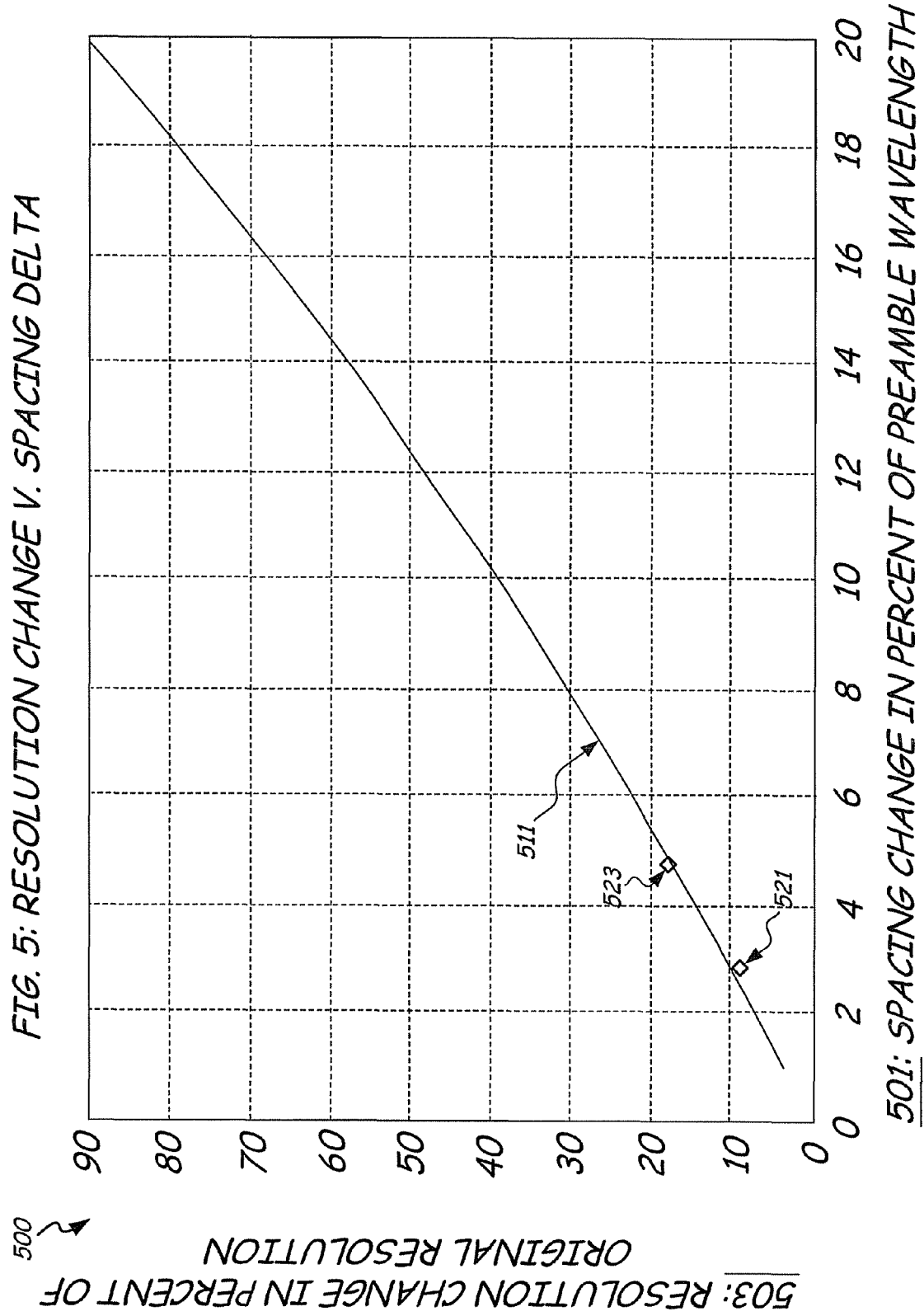

USING SERVO DATA HARMONICS TO MONITOR HEAD-MEDIUM SPACING

CROSS-REFERENCE TO RELATED APPLICATIONS

This application claims the benefit of the prior-filed and provisional application with Ser. No. 61/014,280, filed Dec. 17, 2007 and entitled "Detecting head to disc spacing changes using servo data harmonics", the entirety of which is incorporated by reference herein.

BACKGROUND

Data storage devices have tended to be made ever smaller, yet with ever greater storage capacity, as technology has advanced. One aspect of this has involved using a read and/or write head in close proximity to a data storage medium. In this setting, positioning the read and/or write head close to the medium typically enables a greater density of data storage, though positioning the head too close to the medium raises the risk of impact between the head and the medium, which often inflicts significant damage and significantly degrades future performance of the device.

SUMMARY

Methods and devices that enable highly accurate determination of a spacing between a head and a data storage medium are provided. One illustrative example pertains to a method that includes measuring a first amplitude and a second amplitude in a servo pattern signal derived from a transducer head interacting with a medium; and providing an indication of a change in a spacing distance between the head and the medium, wherein the change in the spacing is evaluated using a spacing relation derived from a ratio of the first harmonic amplitude and the second harmonic amplitude.

Other features and benefits that characterize various embodiments will be apparent from the following detailed description, the associated drawings, and the other disclosure herein.

BRIEF DESCRIPTION OF THE DRAWINGS

FIG. 3 depicts an illustrative example of a servo pattern for a servo pattern signal, according to an illustrative embodiment.

FIG. 4 depicts a read back signal at two different head-medium spacing values, according to an illustrative embodiment.

FIG. 5 depicts a graph of predicted changes in a spacing distance in relation to measured changes in resolution, according to an illustrative embodiment.

DETAILED DESCRIPTION

Figure 1:
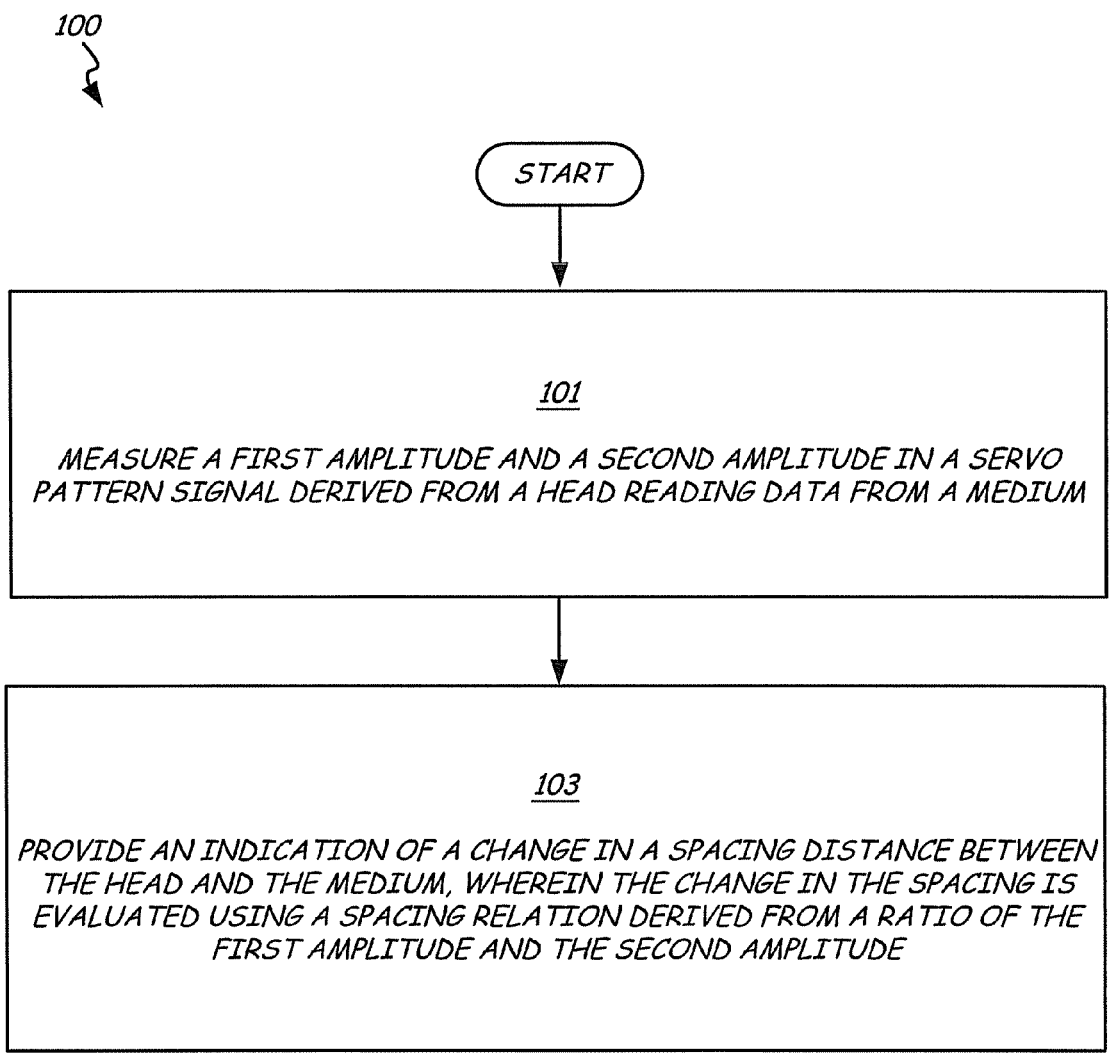
FIG. 1 depicts a flowchart for a method in accordance with one illustrative embodiment.

FIG. 1 depicts a flowchart for a method 100, according to one illustrative embodiment. Method 100 includes various inventive elements that provide substantial advantages in performance, as detailed with reference to FIG. 1 and the remaining figures. Method 100 includes step 101 of measuring a first amplitude and a second amplitude in a servo pattern signal derived from a transducer head interacting with a medium; and step 103 of providing an indication of a change in a spacing distance between the head and the medium, wherein the change in the spacing is evaluated using a spacing relation of the first amplitude and the second amplitude, in this illustrative embodiment. The head and medium may illustratively be incorporated in disc drives and any other types of data storage systems. Using two amplitudes may provide much greater spacing accuracy than using only one amplitude. In one illustrative embodiment, both odd and even amplitudes are used, such as the first and second harmonics, rather than only odd harmonics, such as the first and third. This may allow greater accuracy, illustratively because the second harmonic has a higher signal-to-noise ration than the third, and may even be readable while the third harmonic is lost in noise. Method 100 is further explained in the additional figures and the corresponding remarks below.

Method 100 provides a highly accurate way of evaluating the spacing distance between a head and a medium, and changes in that spacing. This improved accuracy in monitoring head-medium spacing in turn contributes to additional useful functions, such as enabling the head to be operated more closely to the medium with less risk of harmful head-medium contact, thereby enabling greater data storage density and greater reliability, as an illustrative example. In one illustrative embodiment, method 100 also enables making a spacing error measurement from each servo sector of the medium, which contributes to dynamically optimizing the head-medium spacing. This enables both real-time monitoring of the spacing dynamics and better control of those dynamics. As another illustrative advantage, method 100 provides accurate evaluations of head-medium spacing using data that is already available in a servo pattern signal, and does not require any additional signal bandwidth or the addition of any artifacts such as extra fields that would negatively impact the format overhead.

Figure 2:
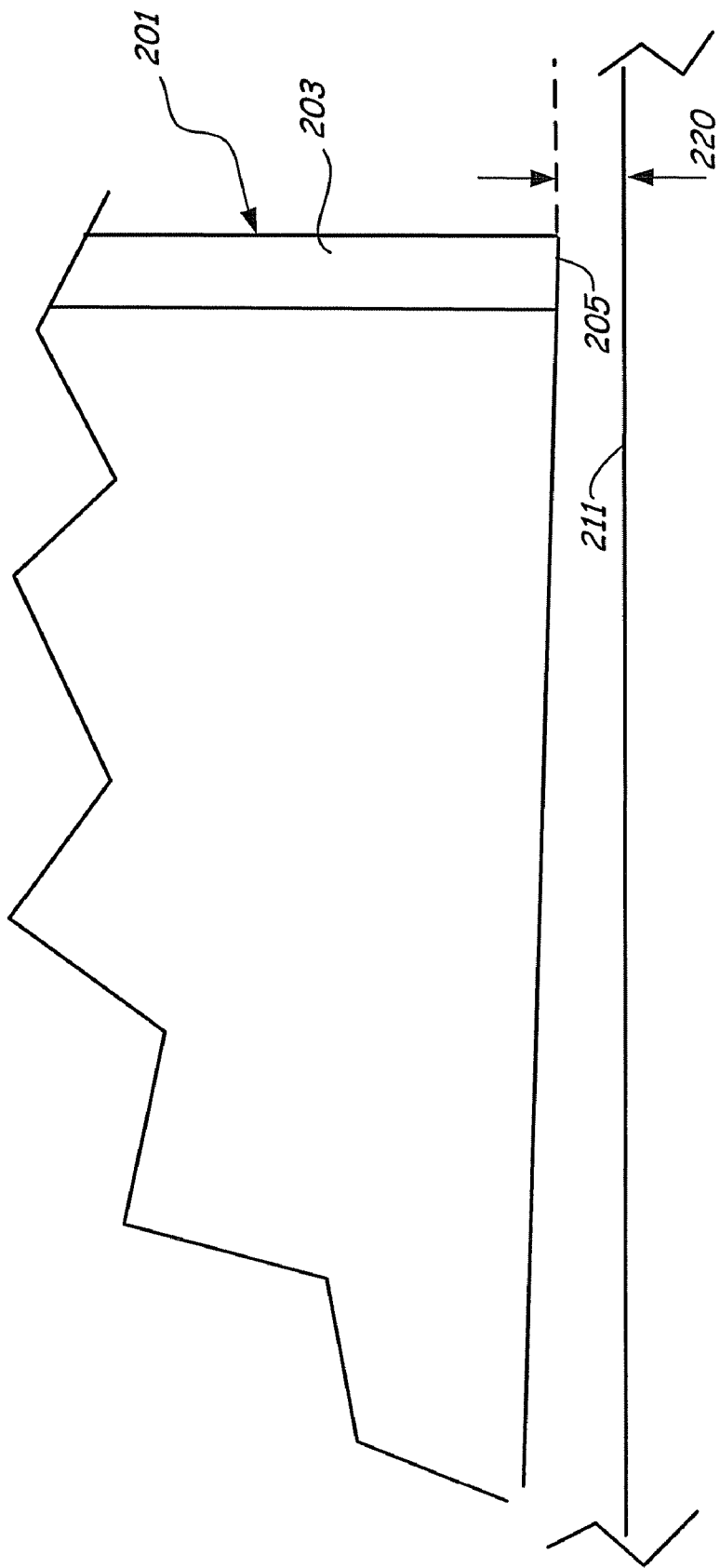
FIG. 2 depicts a side plan view of a data storage device, according to an illustrative embodiment.

Method 100 may be further elaborated as follows, with respect to FIG. 2. FIG. 2 depicts a simplified side plan view of a read/write head 201 disposed in proximity to a data storage medium 211. Head 201 includes a read sensor 203 with a sensor tip 205 that is typically the closest part of head 201 to medium 211, and is separated from medium 211 by head-medium spacing distance 220. Head 201 may be capable of reading data from and/or writing data to medium 211.

As a head reads a signal from an adjacent medium, that signal is influenced by variations in the spacing between the head and the medium, such that the variations affect harmonic amplitudes, i.e. harmonics, of the signal. Changes in the head-medium spacing are subject to being evaluated by manipulating pairs of ratios of those harmonic amplitudes. In one illustrative form, this association between the head-medium spacing and the harmonic amplitudes of a signal may be expressed in the following spacing relation, referred to here as equation 1:

$$V_n = MKCe^{\frac{-2\pi d}{\lambda_n}} \quad \text{(Eq. 1)}$$

In equation 1, $V_n$ is the amplitude of a harmonic corresponding to wavelength $\lambda_n$; M is the magnetic field function; K and C are system parameters; d is the spacing between the head and the medium; and $\lambda_n$ is the wavelength of a given harmonic n.

This spacing relation can be manipulated to derive the evaluated change in head-medium spacing associated with changes in a pair of harmonics of a read signal from the head at each spacing point along the medium. Using a ratio of the third harmonic to the first harmonic at each of two head-medium spacing positions, and taking the natural logarithm of both sides of equation 1 and rearranging to solve for head-medium spacing distance d, a difference Ad may then be defined between two such head-spacing distances.

For example, it is possible to evaluate the head-medium spacing based on odd harmonics, such as the first and third harmonics, in a magnetic read back signal. In the illustrative embodiment of FIG. 1, the head-medium spacing may illustratively be evaluated based on both odd and even harmonics, such as the first and second harmonics, in a signal; and that signal used may be derived from the servo pattern signal, for example. In this case, the solution for Δd may be expressed as:

$$\Delta d \equiv d_2 - d_1 = \frac{-\lambda}{2\pi} \ln\left(\frac{AR_2}{AR_1}\right) \quad \text{(Eq. 2)}$$

In this illustrative example, $AR_2$ is the ratio of the second harmonic amplitude to the first harmonic amplitude for one instance of head-medium spacing, and $AR_1$ is the ratio of the second harmonic amplitude to the first harmonic amplitude for another instance of head-medium spacing. The spacing relation defined by equation 2 therefore specifies that the spacing distance Ad is proportional to a product of the wavelength of a harmonic λ and the natural logarithm of a quotient $AR_2/AR_1$ of a ratio AR between the second harmonic amplitude and the first harmonic amplitude at two separate head-medium spacings 2 and 1, in accordance with one illustrative embodiment.

FIG. 3 depicts an illustrative example of a servo pattern 300 for a servo pattern signal read from a medium by a read head. The servo pattern includes a preamble field 301, a servo address mark (SAM) field 303, a Gray code field 305, a first pattern sensor field 307, and a second pattern sensor field 309. In one illustrative embodiment, one or both of the pattern sensor fields may be used as the first amplitude, and the preamble field may be used as the second amplitude. Either harmonic amplitudes, or amplitudes that are non-integer harmonics of each other may be used, as is discussed further below. Other illustrative examples are also provided below. The harmonic amplitudes from the pattern sensor fields and the preamble field may be used in the spacing relation of equation 2 to evaluate the spacing distance between the head and the medium by generating the value for the spacing distance Δd produced by the equation. In this illustrative example, the ratios $AR_1$ and $AR_2$ are the ratios of the second, preamble amplitude to the first, pattern sensor amplitude, at each of two head-medium spacings $AR_1$ and $AR_2$, respectively.

This method may further include using a means for estimating the maximum amplitude of the pattern sensor field. A variety of different estimation techniques may be used for estimating the full scale pattern sensor signal, such as using a vector sum of pattern sensor amplitudes, in one illustrative example. The estimation technique may be selected with reference to the topology of the servo pattern. Using the pattern sensor amplitudes may be done consistently with a variety of types of servo patterns, illustratively including a null pattern, an amplitude split burst pattern, a phase encoded pattern, and any pattern in which the pattern sensor signals are of a different frequency than the preamble, for example. As one illustrative example, the pattern sensor frequency may be one half the preamble frequency, defining the two amplitudes as integer harmonics of each other. Integer harmonic amplitudes may provide certain advantages, such as simplifying the calculations that are performed by a controller or other associated processor using the amplitudes to evaluate the spacing and the changes therein, in one illustrative embodiment.

Additionally, where there are at least two pattern sensor fields and one has a lower frequency than the other one, the lower frequency pattern sensor signal may show a larger signal increase, due to a larger spacing loss. An automatic gain control (AGC) with sufficient bandwidth may be used to set one amplitude according to a target amplitude. One of the amplitudes may then be taken as a given, i.e. as equal to the target amplitude set by the AGC, rather than having to be measured or an estimate thereof calculated. For example, in one illustrative embodiment, the AGC may set the preamble amplitude always effectively equal to a target amplitude. The preamble amplitude may be used as the second amplitude in the spacing relation in this embodiment. Only one amplitude then remains to be evaluated, which in this embodiment may be the first pattern sensor field, which is used as the first amplitude in the spacing relation. Having only one of the amplitudes unknown may save significant calculation time and resources for the controller or other processor performing the calculations to evaluate the spacing relation.

When measuring the pattern sensor full scale signal, noise may be reduced by accurately characterizing the system, such as the width of the head relative to track pitch for tracks in the medium. As a head increases in width relative to the written track on the medium, the full scale estimate by simple vector sum becomes more accurate. This is in part because the cross track characteristic becomes more sinusoidal in nature. If the head width is known to the full scale estimation algorithm, the estimate can be adjusted to more accurately reflect the true full scale amplitude of the pattern sensor field. The amplitude of the pattern sensor field may therefore be more accurately estimated by using compensation for characteristics associated with a width of the head relative to a track pitch of the medium. Measurement of the pattern sensor signals may also be made more accurate by increasing the automatic gain control (AGC) bandwidth.

In other illustrative examples, the first amplitude may be derived from an amplitude of a servo address mark (SAM) field from the servo pattern signal, or the first amplitude may be derived from an amplitude of a Gray code field from the servo pattern signal, among other embodiments. The second amplitude in this illustrative example may be derived from the preamble field. In still other embodiments, the second harmonic amplitude and the first harmonic amplitude may both be derived from portions of the servo address mark field from the servo pattern signal, or the second harmonic amplitude and the first harmonic amplitude may both be both derived from portions of the Gray code field from the servo pattern signal.

This is better understood with reference to FIG. 4, which depicts a read back signal 400 at two different head-medium spacing values. It has been passed through an automatic gain control to reference the preamble back to the original starting amplitude. While different pattern sensor fields within a servo pattern may have different amplitudes, the SAM field and Gray code field may also have sections of lower frequency content that have corresponding amplitude differences. This is due at least in part to the changes in the spacing, i.e. the spacing delta, acting on each spectral component differently, in accordance with equation 1. There are a variety of techniques by which these amplitude differences may be measured and used to evaluate the head-medium spacing. For example, one illustrative technique involves measuring the resolution of the signal. In one illustrative embodiment, this may involve measuring the difference in amplitude peaks between the SAM or Gray code fields and the preamble. In another illustrative embodiment, this may involve measuring the amplitude delta between one or more of the low-density peaks and one or more of the high-density peaks, in either the SAM field or the Gray code field, or both. This may include measuring the peak amplitude of one or more of the lower density pulses and the peak amplitude of one or more of the higher density pulses, within either or both of the SAM field or the Gray code field. Pulses may be considered lower density or higher density relative to each other, i.e. that one pulse is of lower or higher density relative to a selected second pulse, and vice versa. The differences between these different peak amplitudes may be used as the amplitude delta. The resolution of the signal, in terms of the amplitude delta, may then be used as the basis for evaluating the change in the spacing distance between the head and the medium, also known as the fly height delta. One illustrative advantage of this is that it is often simpler to measure peak amplitudes than to measure harmonic content in the signal. Equation 2 may still be used to calculate theoretical predictions of how the amplitude deltas will relate to changes in the spacing distance, but is not necessary to calculate during operation, to evaluate changes in the spacing distance. Instead, the changes in the spacing distance may be evaluated simply as the ratio of the peak amplitudes. Comparing the peak amplitudes provides a way to measure fly height deltas without the necessity of calculating exponentials or logarithms in the controller's software, and thereby measuring fly height in a way that is faster and imposes a lower processing performance cost than by directly measuring harmonic content.

FIG. 5 demonstrates such a prediction of changes in the spacing distance in relation to measured changes in resolution, in terms of the amplitude deltas. Graph 500 shows spacing change, in percent of the preamble wavelength, along x-axis 501, and resolution change, in percent of the initial resolution, along y-axis 503. Curve 511 depicts the relation between these values according to a theoretical simulation using equation 2, while data points 521 and 523 are the results of experimental measurements, which closely agree with the theoretical simulation. In different embodiments, the theoretically predicted relation represented by FIG. 5 could be calculated to different levels of precision by the controller; it could be approximated as a linear function to lower processing cost with little loss of accuracy, or it could be approximated more accurately with modestly higher processing time.

In addition to measuring head-medium spacing by directly measuring signal resolution, head-medium spacing may also be evaluated using a finite impulse response (FIR) filter. A finite impulse response filter may be used with the servo pattern signal, wherein the finite impulse response filter uses automatically adapting weights to equalize data from the servo pattern signal with a target response. The changes in the post-adaptation tap values are then indicative of the change in the resolution of the signal, due to changes in the head-medium spacing. Evaluating the spacing distance may therefore include deriving the spacing relation using the automatically adapting weights. In another illustrative example, more complex models of the signal resolution using one or more system characterization factors may be used, potentially in combination with a finite impulse response filter, to evaluate the changes in head-medium spacing. For example, the system characterization factors may include the width of the head relative to the track pitch of the medium, as discussed above. Increases in the width of the head with respect to the track medium may enable greater accuracy in the full-scale estimate using vector sums or other full scale estimation techniques, in different embodiments.

In another illustrative embodiment, amplitudes that are non-integer harmonics of each other may be used for evaluating the changes in head-medium spacing. Using non-integer harmonics may provide certain advantages. At least one of the amplitudes may be selected from a relatively dominant spectral frequency from the servo pattern signal, and that has lower measurement variability than other amplitudes within the servo pattern signal, without regard to whether the two selected amplitudes are integer harmonics of each other. The one or both amplitudes selected for lower measurement variability may provide lower measurement variability than is available with amplitudes that are integer harmonics of each other. In one illustrative embodiment, using non-integer harmonic amplitudes may require additional computational time and resources by the controller or other processor performing the evaluation of the head-medium spacing based on the spacing relation and the two amplitudes, while providing greater accuracy in the evaluation of the spacing changes due to the lower measurement variability of the amplitudes used for the evaluation.

A device may therefore include a data storage medium, a head that is translatably disposed in proximity to the data storage medium, and a controller, communicatively connected with the head. The controller may be configured to measure an even harmonic amplitude and an odd harmonic amplitude in a servo pattern signal derived from the head reading data from the data storage medium, and the controller may be further configured to evaluate a spacing distance between the head and the medium as a spacing relation of the even harmonic amplitude and the odd harmonic amplitude. The controller may be further configured to provide a signal to a component that controls the positioning of the head, to adjust the position of the head in response to the evaluation of the spacing distance from the spacing relation of the even harmonic amplitude and the odd harmonic amplitude, in an illustrative example.

The controller may be configured to perform these steps, or to perform any of the methods disclosed herein, in a wide variety of ways. For example, the controller may include or have communicative access to a computer-readable medium comprising executable instructions for performing a method as disclosed herein. The controller may further include a processing component that executes that software, and generates an output encoding a signal encoding results of the method, such as a signal that indicates the head-medium spacing distance as determined or evaluated by the method. In another illustrative example, the controller may have these functions implemented in hardware circuitry rather than software, or implemented in an analog hardware system.

Various embodiments therefore include unexpected and novel advantages as detailed herein and as can be further appreciated from the claims, figures, and description by those skilled in the art. Although some of the embodiments are described in reference to a data storage medium or a data storage system, or to even more particular embodiments such as a disc or a disc drive, various other embodiments have application to other data storage technologies. Additionally, it is understood that references to a read head or a head may be illustrative examples of a read and/or write head of any type.

It is to be understood that even though numerous characteristics and advantages of various illustrative embodiments have been set forth in the foregoing description, together with details of the structure and function of various embodiments, this disclosure is illustrative only, and changes may be made in detail, especially in matters of structure and arrangement of parts within the principles of the present disclosure, to the full extent indicated by the broad, general meaning of the terms in which the appended claims are expressed. For example, the transducer head may be configured to read and/or write data signals embodied in magnetic, optical, or any other type of interaction; and any reference to a "head" in this application may apply to any type of transducer. The medium may illustratively include a disc, tape, or any other form, and may encode data with magnetism, magnetoresistance, giant magnetoresistance, optics, or any other encoding technique. It will be appreciated by those skilled in the art that the teachings of the present disclosure can be applied to a family of systems, devices, and means encompassed by and equivalent to the examples of embodiments described, without departing from the scope and spirit of the present disclosure. Further, still other applications for various embodiments, including embodiments pertaining to data storage media and data storage systems, are comprised within the present disclosure.

What is claimed is:

1. A method comprising:
    measuring a first amplitude and a second amplitude in a servo pattern signal derived from a transducer head interacting with a medium, wherein the first amplitude is derived from a pattern sensor field from the servo pattern signal; and
    providing an indication of a change in a spacing distance between the head and the medium, wherein the change in the spacing is evaluated using a spacing relation derived from a ratio of the first amplitude and the second amplitude.

2. The method of claim 1, wherein the spacing relation specifies that the spacing distance is proportional to a product of a wavelength of an amplitude multiplied by a natural logarithm of a quotient of a first ratio divided by a second ratio, wherein the first ratio is between the second amplitude and the first amplitude at a first head-medium spacing, and the second ratio is between the second amplitude and the first amplitude at a second head-medium spacing.

3. The method of claim 1, wherein the second amplitude is derived from a preamble field from the servo pattern signal.

4. The method of claim 3, wherein the amplitude of the preamble field is derived from a target amplitude associated with an automatic gain control.

5. The method of claim 1, wherein the amplitude of the pattern sensor field is estimated using a vector sum of pattern sensor amplitudes.

6. The method of claim 1, wherein a plurality of pattern sensor fields are comprised in the servo pattern signal, wherein a lower frequency pattern sensor field from among the plurality of pattern sensor fields has a lower frequency than a second pattern sensor field from the servo pattern signal, and wherein the lower frequency pattern sensor field is used for evaluating the spacing distance.

7. The method of claim 1, wherein system characterization factors are evaluated, and the amplitude of the pattern sensor field is estimated using the system characterization factors.

8. The method of claim 7, further wherein the system characterization factors comprise characterization of a width of the head relative to a track pitch of the medium.

9. The method of claim 1, wherein at least one of the first amplitude or the second amplitude are selected from at least one of a servo address mark field from the servo pattern signal or a Gray code field from the servo pattern signal.

10. The method of claim 9, wherein the first amplitude and the second amplitude are selected as non-integer harmonies of each other, where at least one of the first amplitude or the second amplitude provides lower measurement variability than is available with amplitudes that are integer harmonics of each other.

11. The method of claim 1, further comprising using a finite impulse response filter with the servo pattern signal, wherein the finite impulse response filter uses automatically adapting weights to equalize data from the servo pattern signal with a target response, wherein evaluating the change in the spacing distance comprises deriving the spacing relation using the automatically adapting weights.

12. The method of claim 1, further comprising measuring the first amplitude and the second amplitude in each of a plurality of servo sectors of the medium, and evaluating respective changes in the spacing distance between the head and the medium in each of the servo sectors of the plurality of servo sectors using the spacing relation.

13. The method of claim 1, wherein measuring the first amplitude and the second amplitude in the servo pattern signal comprises measuring a first peak amplitude of one or more pulses of relatively lower density and a second peak amplitude of one or more of pulses of relatively higher density within either or both of a SAM field or a Gray code field comprised in the servo pattern signal, and the change in the spacing is evaluated based on a ratio of the first peak amplitude and the second peak amplitude.

14. A method comprising:
    measuring an odd harmonic amplitude and an even harmonic amplitude in a servo pattern signal derived from a transducer head interacting with a medium;
    evaluating a spacing distance between the head and the medium using a spacing relation in which the spacing distance is proportional to a natural logarithm of a ratio between the odd harmonic amplitude and the even harmonic amplitude; and
    providing a signal that indicates the spacing distance.

15. The method of claim 14, wherein the odd harmonic amplitude is derived from an amplitude of a pattern sensor field from the servo pattern signal.

16. The method of claim 14, wherein the odd harmonic amplitude is derived from an amplitude of a servo address mark field from the servo pattern signal.

17. The method of claim 14, wherein the odd harmonic amplitude is derived from an amplitude of a Gray code field from the servo pattern signal.

18. A device comprising:
    a data storage medium;
    a transducer head, translatably disposed in proximity to the data storage medium; and
    a controller, communicatively connected with the head, wherein the controller is configured to measure an even amplitude and an odd amplitude in a servo pattern signal derived from the transducer head interacting with the data storage medium, and the controller is further configured to evaluate a spacing distance between the head and the medium as a spacing relation of the even amplitude and the odd amplitude.

19. The device of claim 18, wherein the controller is further configured to provide a signal to a component that controls the positioning of the head, to adjust the position of the head in response to the evaluation of the spacing distance from the spacing relation of the even amplitude and the odd amplitude.

20. A method comprising:
    for each of a plurality of servo sectors of a medium, measuring a first amplitude and a second amplitude in a servo pattern signal derived from a transducer head interacting with the servo sector of the medium; and providing indications of changes in a spacing distance between the head and the medium, wherein respective changes in the spacing distance between the head and the medium are evaluated in each respective servo sector of the plurality of servo sectors using a spacing relation derived from a ratio of the first amplitude and the second amplitude measured in the respective servo sector.

21. The method of claim 20, wherein the spacing relation specifies that the spacing distance is proportional to a product of a wavelength of an amplitude multiplied by a natural logarithm of a quotient of a first ratio divided by a second ratio, wherein the first ratio is between the second amplitude and the first amplitude at a first head-medium spacing, and the second ratio is between the second amplitude and the first amplitude at a second head-medium spacing.

22. The method of claim 20, wherein measuring the first amplitude and the second amplitude for each servo sector comprises measuring a first peak amplitude of one or more pulses of relatively lower density and a second peak amplitude of one or more of pulses of relatively higher density within either or both of a SAM field or a Gray code field comprised in the servo pattern signal derived from the servo sector, and the respective change in the spacing is evaluated based on a ratio of the first peak amplitude and the second peak amplitude.

* * * * *